(12) United States Patent
Jacobs et al.

(10) Patent No.: US 6,566,475 B1
(45) Date of Patent: May 20, 2003

(54) STRESS CRACKING-RESISTANT CYCLOOLEFIN COPOLYMER COMPOSITION

(75) Inventors: Alexandra Jacobs, Niedernhausen (DE); Klaus Berger, Sulzbach (DE); Wilfried Hatke, Hofheim (DE)

(73) Assignee: Ticona GmbH, Kelsterbach (DE)

( * ) Notice: Subject to any disclaimer, the term of this patent is extended or adjusted under 35 U.S.C. 154(b) by 0 days.

(21) Appl. No.: 09/806,778

(22) PCT Filed: Oct. 1, 1999

(86) PCT No.: PCT/EP99/07276

§ 371 (c)(1),
(2), (4) Date: May 3, 2001

(87) PCT Pub. No.: WO00/20496

PCT Pub. Date: Apr. 13, 2000

(30) Foreign Application Priority Data

Oct. 1, 1998 (DE) .......................................... 198 45 222

(51) Int. Cl.$^7$ ......................... C08K 5/098; C08K 5/103; C08K 5/38; C08K 5/01; C08L 45/00

(52) U.S. Cl. ...................... 526/280; 526/281; 526/283; 526/290; 525/210; 525/211; 525/216

(58) Field of Search ............................ 526/280, 281, 526/283, 290; 525/210, 211, 216

(56) References Cited

U.S. PATENT DOCUMENTS 5,576,392 A * 11/1996 Yamamoto et al. ......... 525/289
6,008,298 A * 12/1999 Hatke et al. ................ 525/210

* cited by examiner

*Primary Examiner*—Nathan M. Nutter
(74) *Attorney, Agent, or Firm*—White & Case LLP

(57) ABSTRACT

The present invention relates to a polymer composition comprising one or more cycloolefin copolymers and one or more suitably formulated additives, having improved resistance to stress cracking in air or else in contact with media which give rise to stress cracking.

11 Claims, No Drawings

STRESS CRACKING-RESISTANT CYCLOOLEFIN COPOLYMER COMPOSITION

The present invention relates to a composition made from cycloolefin copolymers (COCs) and from additives for improving stress cracking resistance. The polymer composition of the invention has improved resistance to stress cracking in air, and also in contact with media which give rise to stress cracking.

The lack of resistance of various plastics to stress cracking in air, and also in contact with media which give rise to stress cracking, is a serious problem, since it severely restricts the usefulness of the plastics and reduces the lifetime of the associated components.

Surprisingly, it has been found that a polymer composition which comprises one or more cycloolefin copolymers and one or more suitably formulated additives has improved resistance to stress cracking in air, and also in contact with media which give rise to stress cracking.

The polymer composition of the invention comprises at least one cycloolefin copolymer prepared by polymerizing from 0.1 to 99.9% by weight, based on the total amount of monomers, of at least one polycyclic olefin of the formula I, II, II', III, IV, or V

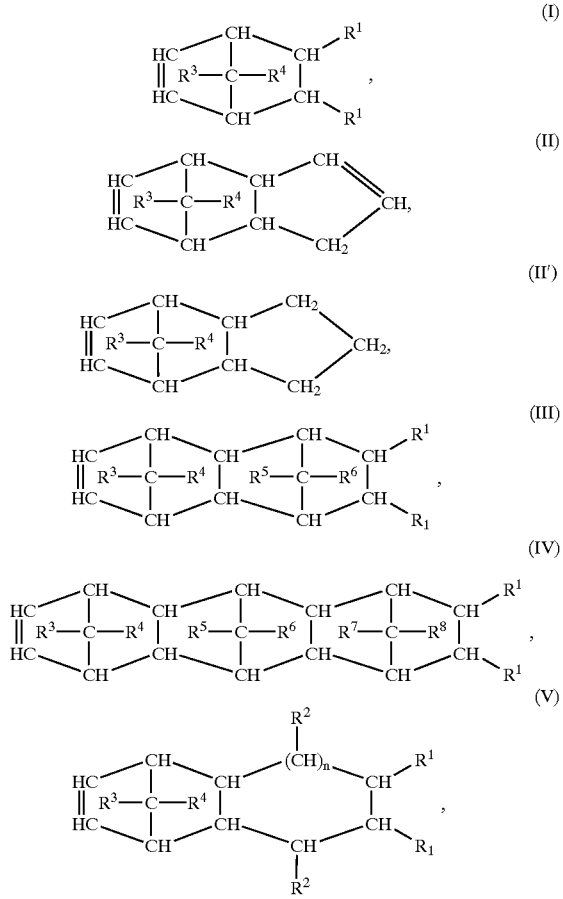

where $R^1$ to $R^8$ are identical or different and are hydrogen or a hydrocarbon radical, and the meaning of the same radical may change in the different formulae, and from 0 to 99.9% by weight, based on the total amount of monomers, of at least one monocyclic olefin of the formula VI

where n is a number from 2 to 10, and from 0.1 to 99.9% by weight, based on the total amount of monomers, of at least one acyclic 1-olefin of the formula VII

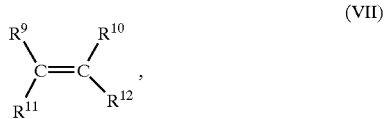

where $R^9$ to $R^{12}$ are identical or different and are hydrogen or a hydrocarbon radical, preferably a $C_6$–$C_{10}$-aryl radical or a $C_1$–$C_8$-alkyl radical.

Preference is given to cycloolefins of the formula I or III, where $R^1$ to $R^8$ are identical or different and are hydrogen or a hydrocarbon radical, in particular a $C_6$–$C_{10}$-aryl radical or a $C_1$–$C_8$-alkyl radical, and the meanings of identical radicals may change in the different formulae.

Where appropriate, one or more monocyclic olefins of the formula VI are used for the polymerization.

Preference is also given to an acyclic olefin of the formula VII, where $R^9$ to $R^{12}$ are identical or different and are hydrogen or a hydrocarbon radical, preferably a $C_6$–$C_{10}$-aryl radical or $C_1$–$C_8$-alkyl radical, such as ethylene or propylene.

Copolymers are in particular prepared from polycyclic olefins, preferably of the formulae I and III, with ethylene.

Particularly preferred polycyclic olefins are norbornene and tetracyclo-dodecene, and these may have $C_1$–$C_6$-alkyl substitution. They are preferably copolymerized with ethylene. Very particular preference is given to ethylene-norbornene copolymers and ethylene-tetracyclododecene copolymers.

The cycloolefin polymers are prepared by heterogeneous or homogeneous catalysis using organometallic compounds. Catalyst systems based on mixed catalysts made from titanium salts and from aluminum organyl compounds are described in DD-A-109 224 and DD-A-237 070. EP-A-156 464 describes the preparation using vanadium-based catalysts. EP-A-283 164, EP-A407 870, EP-A-485 893 and EP-A-503 422 describe the preparation of cycloolefin polymers using catalysts based on soluble metallocene complexes. The preparation processes described in these patents for preparing cycloolefin copolymers, and the catalyst systems used, are expressly incorporated herein by way of reference.

The following compounds are examples of organometallic compounds which may be used as catalysts for preparation of the cycloolefin polymers:

[4-($\eta^5$cyclopentadienyl)-4,7dimethyl-7-phenyl-($\eta^5$-4,5,6,7-tetrahydroindenyl)]zirconium dichloride,
[4-($\eta^5$-3'-tert-butylcyclopentadienyl)-4,7,7-triphenyl-($\eta^5$-4,5,6,7-tetrahydroindenyl)]zirconium dichloride,
[4-($\eta^5$-3'-tert-butylcyclopentadienyl)4,7-dimethyl-7-phenyl-($\eta^5$-4,5,6,7-tetrahydroindenyl)]zirconium dichloride,
[4-($\eta^5$-3'-methylcyclopentadienyl)4,7,7-trimethyl-($\eta^5$-4,5,6,7-tetrahydroindenyl)]zirconium dichloride,
[4-($\eta^5$-3'-methylcyclopentadienyl)4,7,7-triphenyl-($\eta^5$-4,5,6,7-tetrahydroindenyl)]zirconium dichloride,
[4-($\eta^5$-3'-methylcyclopentadienyl)4,7-dimethyl-7-phenyl-($\eta^5$-4,5,6,7-tetrahydroindenyl)]zirconium dichloride,

[4-(η⁵-3'-isopropylcyclopentadienyl)4,7,7-trimethyl-(η⁵-4,5,6,7-tetrahydroindenyl)]zirconium dichloride,
[4-(η⁵-3'-isopropylcyclopentadienyl)4,7,7-triphenyl-(η⁵-4,5,6,7-tetrahydroindenyl)]zirconium dichloride,
[4-(η⁵-3'-isopropylcyclopentadienyl)4,7-dimethyl-7-phenyl-(η⁵-4,5,6,7-tetrahydroindenyl)]zirconium dichloride,
[4-(η⁵-cyclopentadienyl)(η⁵-4,5-tetrahydropentalene)]zirconium dichloride,
[4-(η⁵-cyclopentadienyl)4-methyl-(η⁵-4,5-tetrahydropentalene)]zirconium dichloride,
[4-(η⁵-cyclopentadienyl)4-phenyl-(η⁵-4,5-tetrahydropentalene)]zirconium dichloride,
[4-(η⁵-cyclopentadienyl)4-phenyl-(η⁵-4,5-tetrahydropentalene)]zirconium dichloride,
[4-(η⁵-3'-methylcyclopentadienyl)(η⁵-4,5-tetrahydropentalene)]zirconium dichloride,
[4-(η⁵-3'-benzylcyclopentadienyl)(η⁵-4,5-tetrahydropentalene)]zirconium dichloride,
[2,2,4-trimethyl4-(η⁵-cyclopentadienyl)(η⁵-4,5-tetrahydropentalene)]zirconium dichloride,
[2,2,4-trimethyl-4-(η⁵-3,4-diisopropyl)cyclopentadienyl)(η⁵-4,5-tetrahydropentalene)]zirconium dichloride.

The cycloolefin copolymers suitable for the purposes of the invention have glass transition temperatures from 0 to 250° C., preferably from 20 to 200° C., particularly preferably from 50 to 180° C.

The cycloolefin copolymers suitable for the purposes of the invention have viscosity numbers (determined in decalin at 135° C.) of from 10 to 200 ml/g, preferably from 20 to 120 ml/g, particularly preferably from 40 to 100 ml/g.

The polymer composition of the invention also comprises one or more additives of suitable formulation, which may be selected from the following groups: compounds based on higher fatty acids, e.g. esters of epoxidized fatty acids or amides, mono-, di-, and triglycerides of organic acids, e.g. the mono-, di-, and triglycerides of fatty monoacids, such as stearic acid, oils, e.g. mineral oils, paraffin oils, silicone oils, or white oils, waxes, e.g. polyolefin waxes or montan waxes, ammonium salts or metal salts, particularly alkali metal salts or organic sulfonic acids, e.g. a variety of alkyl sulfonic acids or arylalkylsulfonic acids of various chain lengths.

An example of an alkali metal salt of an organic sulfonic acid is the product Hostastat HS1 from the company Clariant, and examples of esters of epoxidized fatty acids are the Vikoflex products from the company Elf Atochem.

The content of the additives in the polymer composition of the invention is from 0.01 to 25% by weight, preferably from 0.1 to 15% by weight, particularly preferably from 1 to 10% by weight.

The polymer composition comprising at least one cycloolefin copolymer and at least one additive of suitable formulation may be prepared by conventional processes, e.g. by mixing the solid or liquid additive with the pellets of the plastic, and then kneading or extruding the melt of the plastic. In particular, the components may be processed in the form of powders or pellets by joint extrusion from the melt to give pellets or chips, which may then be converted into moldings, e.g. by compression molding, extrusion, or injection molding, blow molding, etc. The polymer composition of the invention may also be prepared by way of what are known as masterbatches. For this, amounts of from 20 to 80% by weight, based on the total weight of the polymer blend, of one or more additives are mixed with one or more cycloolefin copolymers (preferably by joint extrusion), and then brought to the desired final concentration by again mixing (preferably by joint extrusion) with one or more cycloolefin copolymers. This method leads to good dispersion of the additives.

The polymer composition of the invention may comprise conventional amounts of other additives, such as UV stabilizers, optical brighteners, antioxidants, lubricants, plasticizers, antistats, heat stabilizers, colorant additives, such as inorganic or organic pigments or dyes, flame retardants, or reinforcing additives, such as glass fibers, carbon fibers or high-modulus fibers, e.g. aramid polymers or liquid-crystalline polyesters, or the like. They may also comprise fillers, such as inorganic materials, talc, titanium dioxide, or the like.

The polymer composition of the invention is particularly suitable for producing moldings by injection molding, injection blow molding, extrusion blow molding, or extrusion. Films and fibers may also be produced from the polymer composition of the invention.

The polymer composition of the invention is suitable for a wide variety of applications in the packaging sector, in the field of medical technology, in the field of optical applications, and in the industrial and engineering sector.

The polymer composition of the invention has high stress cracking resistance. The polymer composition of the invention also has good flowability, and this is particularly advantageous for injection molding applications. The mechanical properties, e.g. heat resistance, elongation at break, and notch impact strength, can be varied over a wide range, and a wide variety of application sectors is therefore accessible.

What is claimed is:

1. A polymer composition consisting essentially of:

A) one or more cycloolefin copolymers prepared by polymerizing:
a) at least one polycyclic olefin of the formula I, II, II', III, IV, or V,

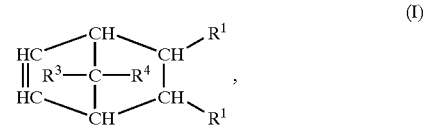

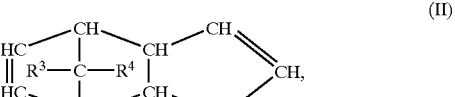

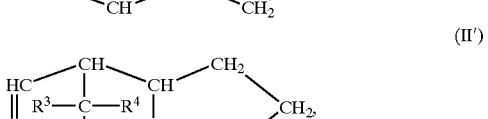

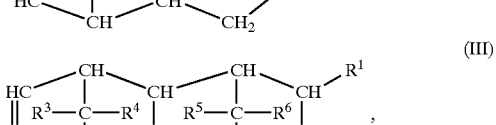

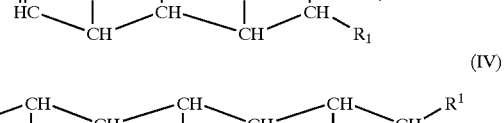

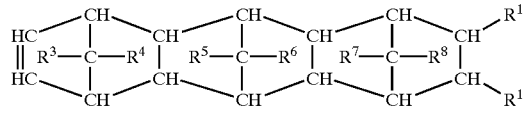

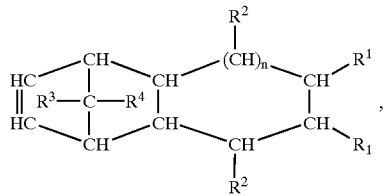
(V)

wherein the polycyclic olefin is present in the copolymer in the range of 0.1 to 99.9% by weight, based on the total amount of monomers;

b) at least one monocyclic olefin of the formula VI,

(VI)

wherein the monocyclic olefin is present in the copolymer in the range of 0 to 99.9% by weight, based on the total amount of monomers; and c) at least one acyclic 1-olefin of the formula VII,

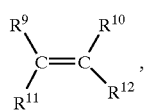
(VII)

wherein the acyclic 1-olefin is present in the copolymer in the range of 0.1 to 99.9% by weight, based on the total amount of monomers, wherein n is a number from 2 to 10, and $R^1$ to $R^8$ and $R^9$ to $R^{12}$ are identical or different, and are hydrogen or a hydrocarbon radical, and the meaning of the same radical may change within the formulae I–VII; and B) one or more additives for improving stress cracking resistance selected from the group consisting of: a higher fatty acid derivative; a glyceride of an organic acid; an oil; a wax; an ammonium salt; and a metal salt.

2. The polymeric composition as claimed in claim 1, wherein the polycyclic cycloolefin has the formula I or III.

3. The polymer composition as claimed in claim 1, wherein one or more of groups $R^9$ to $R^{12}$ are a $C_6$–$C_{10}$-aryl radical or a $C_1$–$C_8$-alkyl radical.

4. The polymer composition as claimed in claim 1, wherein the polycyclic olefin has the formula I or III, and the acyclic 1-olefin is ethylene.

5. The polymer composition as claimed in claim 1, wherein the polycyclic olefin is norbornene or tetracyclododecene which has a $C_1$–$C_6$-alkyl substituent.

6. The polymer composition as claimed in claim 1, wherein the cycloolefin copolymer is an ethylene-norbornene copolymer or an ethylene-tetracyclododecene copolymer.

7. The polymer composition according to claim 1 or 2, wherein the hydrocarbon radical is a $C_6$–$C_{10}$-aryl radical or a $C_1$–$C_8$-alkyl radical.

8. The polymer composition as claimed in claim 1, wherein the acyclic olefin of formula VII is ethylene or propylene, unsubstituted or optionally-substituted with one or more of substituents $R^9$ to $R^{12}$.

9. The polymer composition according to claim 1, wherein the additives are present in the composition in the range of 0.01 to 25% by weight.

10. The polymeric composition according to claim 1, wherein the higher fatty acid derivative is an ester of an epoxidized fatty acid or amide.

11. The polymeric composition according to claim 1, wherein the metal salt is an alkali metal salt of an organic sulfonic acid.

* * * * *